(12) United States Patent
Kim

(10) Patent No.: US 10,085,151 B1
(45) Date of Patent: Sep. 25, 2018

(54) ELECTRONIC APPARATUS AND METHOD OF SELECTIVELY APPLYING SECURITY MODE ACCORDING TO EXCEPTIONAL CONDITION IN MOBILE DEVICE

(71) Applicant: Seungman Kim, McLean, VA (US)

(72) Inventor: Seungman Kim, McLean, VA (US)

(*) Notice: Subject to any disclaimer, the term of this patent is extended or adjusted under 35 U.S.C. 154(b) by 0 days.

(21) Appl. No.: 15/984,375

(22) Filed: May 20, 2018

Related U.S. Application Data

(63) Continuation of application No. 15/853,870, filed on Dec. 25, 2017, now Pat. No. 9,973,929, and a continuation of application No. 15/297,069, filed on Oct. 18, 2016, now Pat. No. 10,064,056, and a continuation of application No. 14/181,728, filed on Feb. 17, 2014, now Pat. No. 9,509,822, and a continuation of application No. 15/972,135, filed on May 5, 2018.

(51) Int. Cl.
| | |
|---|---|
| *H04M 1/66* | (2006.01) |
| *H04M 1/68* | (2006.01) |
| *H04M 3/16* | (2006.01) |
| *H04W 12/06* | (2009.01) |
| *H04W 52/02* | (2009.01) |
| *H04M 1/673* | (2006.01) |
| *H04M 1/67* | (2006.01) |
| *H04M 1/725* | (2006.01) |

(52) U.S. Cl.
CPC .............. *H04W 12/06* (2013.01); *H04M 1/67* (2013.01); *H04M 1/673* (2013.01); *H04M 1/7253* (2013.01); *H04M 1/72563* (2013.01); *H04M 1/72577* (2013.01); *H04M 1/72583* (2013.01); *H04W 52/0274* (2013.01); *H04M 1/66* (2013.01); *H04M 1/72566* (2013.01); *H04M 1/72572* (2013.01); *Y02D 70/00* (2018.01)

(58) Field of Classification Search
None
See application file for complete search history.

(56) References Cited

U.S. PATENT DOCUMENTS

| | | |
|---|---|---|
| 8,600,056 B2 | 12/2013 | Heurtaux et al. |
| 8,600,060 B2 | 12/2013 | Priestley et al. |
| 8,613,070 B1 | 12/2013 | Borzycki et al. |
| 8,626,125 B2 | 1/2014 | Lee et al. |

(Continued)

FOREIGN PATENT DOCUMENTS

| | | |
|---|---|---|
| EP | 2364004 A1 | 9/2011 |
| WO | 2004070591 A1 | 8/2004 |

(Continued)

OTHER PUBLICATIONS

Notification of transmittal of the international search report and the written opinion (12 pages) dated Nov. 2015.

*Primary Examiner* — Idowu O Osifade

(74) *Attorney, Agent, or Firm* — EIPG; Seungman Kim

(57) ABSTRACT

A mobile device includes a display unit to display a screen to set the mobile device in a security mode and an external network connection and an area condition as a safe zone in the security mode, a user interface to receive a user input to activate the mobile device, and a control unit to selectively apply the security mode according to whether the mobile device communicates the external network and whether the mobile device is in the area condition, and a method thereof.

20 Claims, 13 Drawing Sheets

(56) References Cited

U.S. PATENT DOCUMENTS

| | | | |
|---|---|---|---|
| 8,627,433 | B2 | 1/2014 | Conner et al. |
| 8,627,438 | B1 | 1/2014 | Bhimanaik |
| 8,646,069 | B2 | 2/2014 | Kim et al. |
| 8,649,759 | B2 | 2/2014 | Scott et al. |
| 8,751,065 | B1 | 6/2014 | Kato |
| 8,994,499 | B2 | 3/2015 | Zhao et al. |
| 2004/0203895 | A1 | 10/2004 | Balasuriya |
| 2006/0128305 | A1 | 6/2006 | Delalat |
| 2007/0197261 | A1 | 8/2007 | Humbel |
| 2008/0070503 | A1 | 3/2008 | Bang |
| 2009/0011796 | A1 | 1/2009 | Ormson |
| 2012/0009896 | A1* | 1/2012 | Bandyopadhyay ... G06F 1/1643 455/411 |
| 2013/0219454 | A1 | 8/2013 | Hewinson |
| 2013/0298024 | A1 | 11/2013 | Rhee et al. |
| 2014/0203073 | A1 | 7/2014 | Braun |
| 2014/0283135 | A1* | 9/2014 | Shepherd ............. G06F 3/0482 726/29 |
| 2014/0330569 | A1 | 11/2014 | Kolavennu et al. |
| 2015/0051913 | A1 | 2/2015 | Choi |
| 2015/0218872 | A1 | 8/2015 | Breed |
| 2015/0223891 | A1 | 8/2015 | Miller et al. |
| 2015/0358088 | A1 | 12/2015 | Eim et al. |
| 2016/0109954 | A1 | 4/2016 | Harris et al. |
| 2016/0142407 | A1 | 5/2016 | Chun et al. |
| 2016/0155426 | A1 | 6/2016 | Grunn et al. |

FOREIGN PATENT DOCUMENTS

| | | |
|---|---|---|
| WO | 2006090899 A1 | 8/2006 |
| WO | 2012093784 A2 | 7/2012 |

\* cited by examiner

ELECTRONIC APPARATUS AND METHOD OF SELECTIVELY APPLYING SECURITY MODE ACCORDING TO EXCEPTIONAL CONDITION IN MOBILE DEVICE

CROSS-REFERENCE TO RELATED APPLICATIONS

This U.S. non-provisional patent application is a continuation application under 35 U.S.C. § 120 of a U.S. non-provisional application Ser. No. 15/972,135 filed on May 5, 2018, which is a divisional application of a U.S. non-provision patent application Ser. No. 15/853,870 filed on Dec. 25, 2017, now U.S. Pat. No. 9,973,929, which is a continuation application of U.S. non-provisional patent application Ser. No. 15/297,069, filed on Oct. 18, 2016, which is a continuation-in-part application of U.S. non-provisional patent application Ser. No. 14/181,728, filed on Feb. 17, 2014, now U.S. Pat. No. 9,509,822, in the U.S. Patent and Trademark Office, the entire contents of which are hereby incorporated by reference.

BACKGROUND OF THE INVENTIVE CONCEPT

1. Field of the Inventive Concept

The present inventive concept relates to an electronic apparatus and method of selectively applying a security mode in a mobile device.

2. Description of the Related Art

A conventional electronic mobile device, for example, a cellular phone, is set to a security mode or a non-security mode. When the set security mode is set, a user has to input a security code by enter a password, an image, or a gesture though a user interface unit. That is, a user has to input the security code every time to access the mobile device set with the security mode.

Even if a user is in a security safe zone, the user has to enter the security code previously set in the security mode. In order for the user to avoid inconvenience in the security safe zone, a user has to disable the security mode to avoid any inconvenience to enter the security code, and then later enable the security mode.

Moreover, since the mobile device is accessed only with the security code set in the security mode, no one is allowed to access the mobile device without the set security code. That is, a person having a high priority or authorization to access the mobile device cannot access the mobile device of a person having a lower priority or authorization.

SUMMARY OF THE INVENTIVE CONCEPT

The present inventive concept provides an electronic apparatus to selectively apply a security mode in a mobile device.

The present inventive concept provides a method of selectively applying a security mode in a mobile device.

The present inventive concept provides a computer readable medium to contain computer readable codes as a program to execute a method of selectively applying a security mode in a mobile device.

Additional features and utilities of the present inventive concept will be set forth in part in the description, which follows and, in part, will be obvious from the description, or may be learned by practice of the present inventive concept.

The foregoing and/or other features and utilities of the present inventive concept may be achieved by providing a mobile device which is configured to photograph an object, the mobile device including an interface configured to receive a user input and configured to wirelessly communicate with an external network to transmit or receive a data signa, a switch configured to change the mobile device from a power saving mode to a normal mode, a display unit to having a panel to display a photographing object, and a control unit configured to set a password as a security mode and to set an exceptional condition as a safe zone of the security mode, wherein the exceptional condition comprises the external network and an area condition, configured to not display a screen on the display unit to receive the password, and to change the mobile device from the power saving mode to the normal mode without the password as the safe zone of the security mode when the mobile device is in the area condition and when the mobile device wirelessly communicates with the external network, and configured to display the screen on the display unit to receive the password, and to change the mobile device from the power saving mode to the normal mode by receiving the password as a security check process of the security mode when the mobile device is not in the area condition or when the mobile device does not wirelessly communicate with the external network.

The external network of the exceptional condition may include a wireless communication between the mobile device and the external network, and the area condition may include an area in which the mobile device is located.

The area condition may be associated with the data signal of the external network.

The area condition may include a home or an environment.

The area condition may include an area defined by a line.

The area condition may include a house location, the control unit may display the screen when the mobile device is not in the house location, and the control unit may not display the screen when the mobile device is in the house location and when the mobile device wirelessly communicates with the external network.

The external network may include at least one network using a WIFI device, a wireless communication station, a carrier service station, a service provider, a wireless communication device, another mobile device, a home appliance, a vehicle, and a medical device.

The switch may include a sensor to detect a motion of the mobile device or to detect a motion or image of a user.

The area condition may be set after the password is set or input as the security mode.

The control unit may determine whether to display the screen or not when the mobile device is changed from the power saving mode to the normal mode after the exceptional condition is set.

The control unit may display the screen to perform the security check process of the security mode in response to an operation of the switch when a location of the mobile device does not match the area condition or when the mobile device is not connected to the external network for wireless communication.

The control unit may not display the screen to skip the security check process of the security mode in response to an operation of the switch when a location of the mobile device matches the area condition and when the mobile device is connected to the external network for wireless communication.

The display unit may display an unlock message section for an unlock operation according to an operation of the switch, and the display unit may not display the screen in response to the unlock operation when a location of the mobile device is an area of the area condition and when the interface of the mobile device wirelessly communicates with the external network.

The external network may include a plurality of external devices, and the control unit may select at least one of the plurality of external devices to set the external network of the exceptional condition.

The external network of the exceptional condition may include a connection state of the external network for wireless communication.

The control unit may display the screen to receive the password when the area condition is set or when the area condition is changed.

The external network of the exceptional condition may include a wireless communication method between the mobile device and the external network.

The interface may wirelessly communicate with a plurality of external networks, and the control unit may be configured to set at least one of the plurality of the external networks as the external network of the exceptional condition.

The control unit may be configured to select the external network as the exceptional condition, and the control unit may not display the screen on the display unit to receive the password, and to change the mobile device from the power saving mode to the normal mode without the password as the safe zone of the security mode when the mobile device is in the area condition or when the mobile device wirelessly communicates with the selected external network.

The control unit may be configured to select an area as the area condition of the exceptional condition, and the control unit may not display the screen on the display unit to receive the password, and to change the mobile device from the power saving mode to the normal mode without the password as the safe zone of the security mode when the mobile device is in the selected area of the area condition or when the mobile device wirelessly communicates with the external network.

BRIEF DESCRIPTION OF THE DRAWINGS

These and/or other features and utilities of the present general inventive concept will become apparent and more readily appreciated from the following description of the exemplary embodiments, taken in conjunction with the accompanying drawings of which.

DETAILED DESCRIPTION OF THE EXEMPLARY EMBODIMENTS

Figure 1:
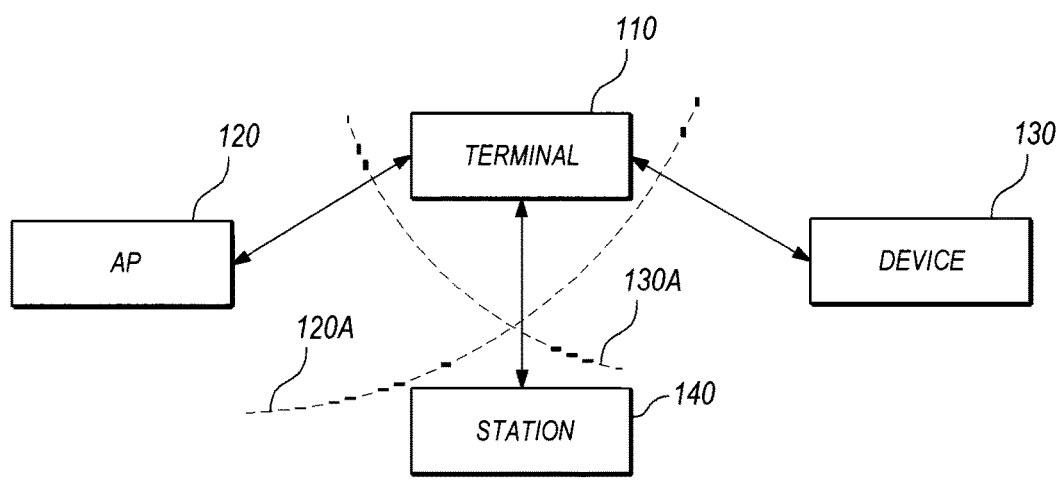
FIG. 1 is a block diagram illustrating an electronic terminal to communicate with external devices according to an embodiment of the present inventive concept.

Reference will now be made in detail to exemplary embodiments of the present general inventive concept, examples of which are illustrated in the accompanying drawings, wherein like reference numerals refer to the like elements throughout. The exemplary embodiments are described below in order to explain the present general inventive concept while referring to the figures.

FIG. 1 illustrates an electronic terminal apparatus 110 to communicate with one or more external apparatuses according to an embodiment of the present inventive concept. The electronic terminal apparatus 110 may be a computer apparatus, a portable personal computer, a mobile electronic device, a mobile phone, a mobile tablet apparatus, a mobile tablet computing apparatus, an audio or video recording and/or reproducing apparatus, a photographing apparatus, a communication device, etc.

The external apparatus may be an access point (AP) 120 such as a wireless access point device to connect to a wireless network using WiFi, WiFi direct, or related standards, a device 130 such as a Bluetooth device or radio frequency identification (RFID) device, etc., and a station for wireless communication such as a carrier service station for 4G, LTE, etc. However, the present general inventive concept is not limited thereto. It is possible that the external apparatus may be another electronic apparatus. It is also possible that the external apparatus may be an apparatus to communicate with the terminal 110 to transmit and receive data therebetween, and such an apparatus may be a home appliance, such as a refrigerator or air conditioner.

The terminal 110 may be disposed within an area defined by a line 120a distanced from the AP 120 or an area defined by a line 130a distanced from the device 130. The terminal 110 may communicate with the AP 120 using the AP-related technology when being disposed within the area defined by the line 120a, and may also communicate with the device using the device-related technology when being disposed within the area defined by the line 130a.

The terminal 110 may have menus and/or functions to correspond to data (signal) of the AP 120, the device 130, and the station 140. The terminal 110 may have menus and functions to correspond to data (signal) stored in a storage unit of the terminal 110.

Figure 2:
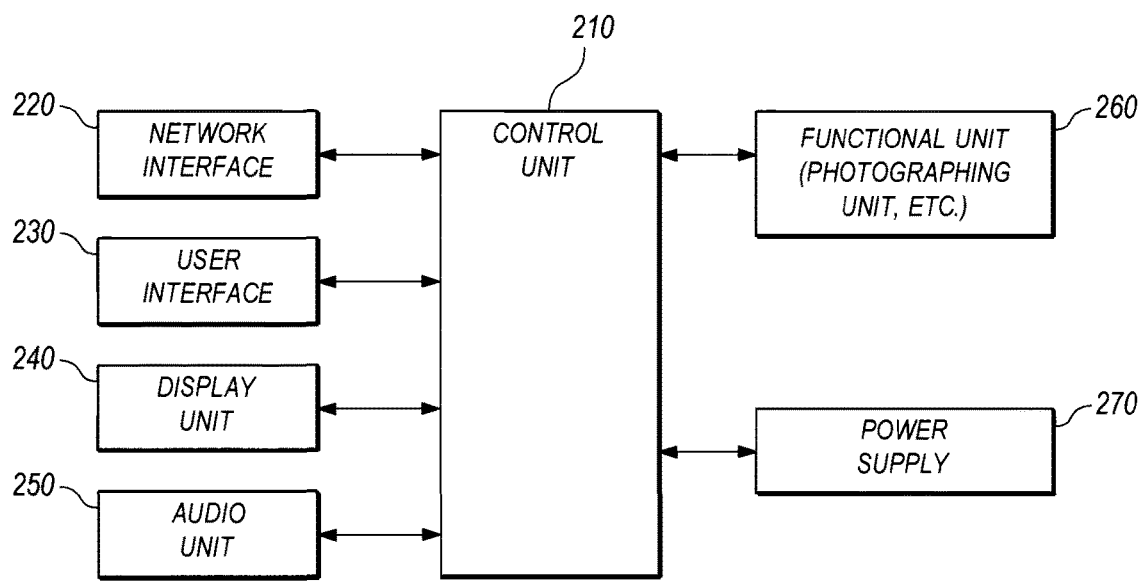
FIG. 2 is a diagram illustrating an electronic terminal according to an embodiment of the present inventive concept.

FIG. 2 illustrates a block diagram of an electronic terminal according to an embodiment of the present inventive concept. The terminal may include a control unit 210, a network interface 220, a user interface 230, a display unit 240, an audio unit 250, one or more functional unit 260, a power supply unit 270 including a battery and a battery charging unit. The above components may be disposed in or on a housing of the terminal.

The control unit 110 may control operations of the terminal and may include a data storage unit, for example, a semiconductor memory unit. The control unit 110 may be connected to an external data storage unit disposed in the housing. The housing of the terminal may include a port such that another external data storage can be detachably attached to the port of the housing, and the port may be connected to the control unit 110 to transmit and receive data.

The network interface unit 220 may communicate with an external network apparatus, for example, the AP 120, the device 130, and the station which are illustrated in FIG. 1.

The user interface unit 230 may receive a user input to control operations of the terminal. The user interface unit 230 may include a physical button or key board such as QWERTY keyboard. The user interface unit 230 may have a sensor to detect a user gesture as a user input. The user interface unit 230 may include a microphone to detect a user voice as a user input. The user interface unit 230 may be a sensor to detect an image as a user input. The display unit 240 may include a screen to display an image corresponding to operations of the terminal. The display unit 240 may include a panel or a touch screen to perform a function to display an image and a function to receive a user input. The user interface unit 230 and the display unit 240 may be formed as a single integrated body. The audio unit 250 may be a speaker and/or a microphone.

The functional unit 260 may be a photographing unit to photograph an object and to generate a signal corresponding to the photographing object. The signal may be processed in the control unit 210, displayed in the display unit 240, and/or transmitted to the external apparatus through the network interface unit 220.

The power supply unit 270 may be connectable to an external power source using a wired and/or wireless method.

The control unit 210 is configured to selectively perform a security mode according to a condition set by a user when the terminal receives a user input corresponding to a power-on, an activation mode in response to a deactivation mode, a wake-up mode in response to a sleep mode, and/or a normal mode in response to a power-saving mode. The activation, wake-up, and normal mode may be usable as a common function of the terminal or may be usable differently, according to a design or user preference. The condition may be a safe zone condition in a security mode or may be a non-safe zone in a non-security mode, for example. After the condition is set in a normal mode of the terminal, the terminal is changed to the deactivation mode (the sleep mode or the power-saving mode) a predetermined time after the normal mode or a predetermined time after no user input. And then the terminal provides a process for the security mode or does not provide the process for the security mode according to the condition when being changed to the activation mode (wake-up mode or the normal mode) according to the user input.

FIGS. 3A-3D illustrating an electronic terminal 300 formed with a display unit and a user interface unit to display screens 300a-300d corresponding to operations of the electronic terminal 300 according to an embodiment of the present inventive concept.

Figure 3A:
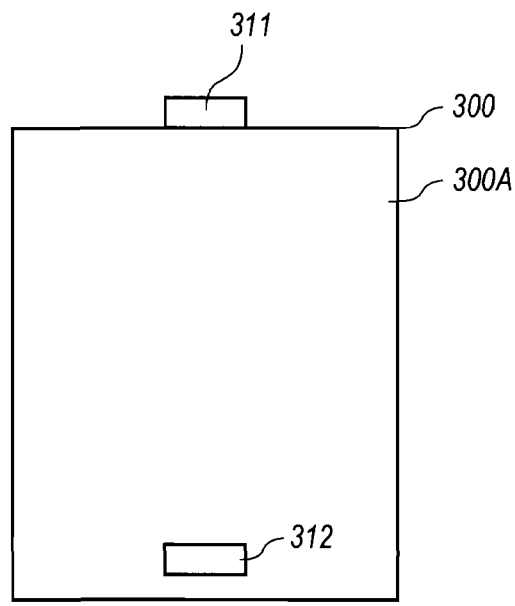
FIGS. 3A-3D are views illustrating an electronic terminal with a display unit and a user interface unit according to an embodiment of the present inventive concept.

As illustrated in FIG. 3A, the screen 300a of the terminal 300 A does not show an image according to a deactivation mode, a sleep mode, or a power saving mode. The terminal 300 may have a power switch 311 and a switch 312 as a user input. The power switch 311 may be usable to turn on and off the terminal, and the switch 312 may be usable to change a mode of the terminal 300, that is, to change from the deactivation mode, the sleep mode, or the power saving mode to an activation mode, a wake-up mode, or a normal mode. The switch 312 may be a sensor to detect a motion of the terminal 300 or to detect a motion (image) of a user as a user input.

Figure 3B:
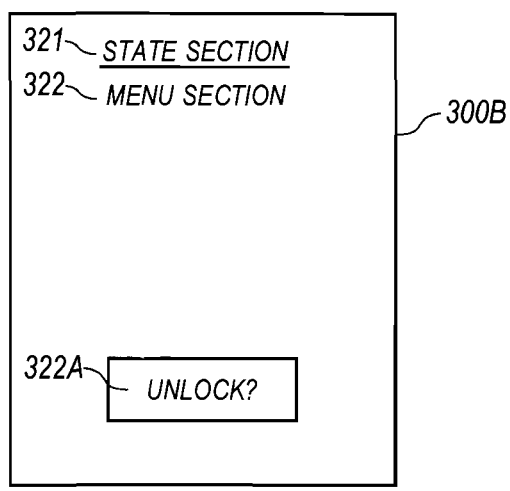

When the switch 312 of FIG. 3A is selected, the screen 300b of FIG. 3B may be displayed on a display unit to unlock or select a security process to access the terminal 300 in a security mode. The screen 300b may include a state section 321 and a menu section 322. The state section 321 may include a communication state with the AP 120, the device 130, and/or the station 321 of FIG. 1, and may also include other states corresponding to operations or functions set in the terminal 300 or environment around the terminal 300. The other states may include a time display or a battery state display, a temperature state display, a weather state display, etc. When the terminal 300 is in a power-on state, the terminal monitors, detects, determines, and/or performs communications with external devices to correspond to the above-described states of the state section 321.

Figure 3C:
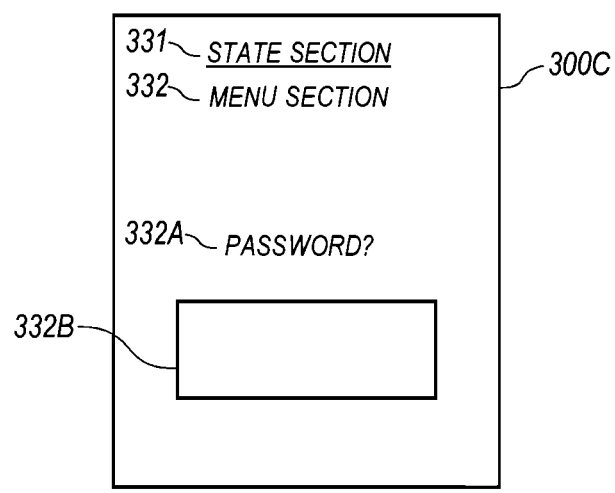
Figure 3D:
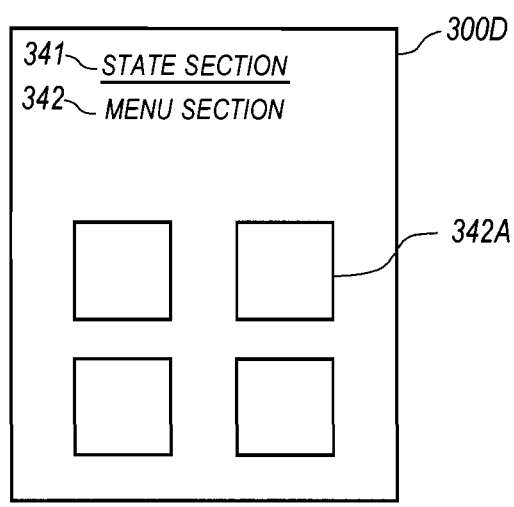

When a menu to unlock the terminal 300 is selected from the screen 300b, the screen 300c is displayed to show a security check process, for example, a password input process, as illustrated in FIG. 3C. The screen 300c may include a state section 331 and a menu section 332 having a password indication section 332a and a password input section 332b. When a password input by the user through the password input section 332b is identical to a password previously stored therein, the terminal 300 displays the screen 300d to show a state section 341 and a menu section 342 with menus (or icons) 342a.

When a first predetermined condition is set in the terminal 300 as a safe zone in a security mode (password setting mode), the screen 300a is changed to the screen 300d without displaying the screens 300b and 300c when the first predetermined condition is met. When the first predetermined condition is not met, the terminal displays the screens 200b and 300c to require a security process to enter a password. When a second predetermined condition is set in the terminal 300 as a non-safe zone in a non-security mode (no password setting), the terminal displays the screens 300a, 300b, 300c, and 300d to normally access the terminal when the second predetermined condition is met. When the second predetermined condition is not met, the terminal 300 may not display the screens 300b and 300c.

The state section of the screen 300d may include an image corresponding to the safe zone and/or the non-safe zone according to the security mode and/or non-security mode, respectively. The state section may not be selectable by a user as a user input. The menu section 342 of the screen 300d may include one or more menus selectable by a user as a user input to perform a function or operation of the terminal 300. The menu section 342 of the screen 300d may include a settings menu (icon) to set the security mode, the non-security mode, the safe zone, and/or the non-safe zone, etc.

Figure 4:
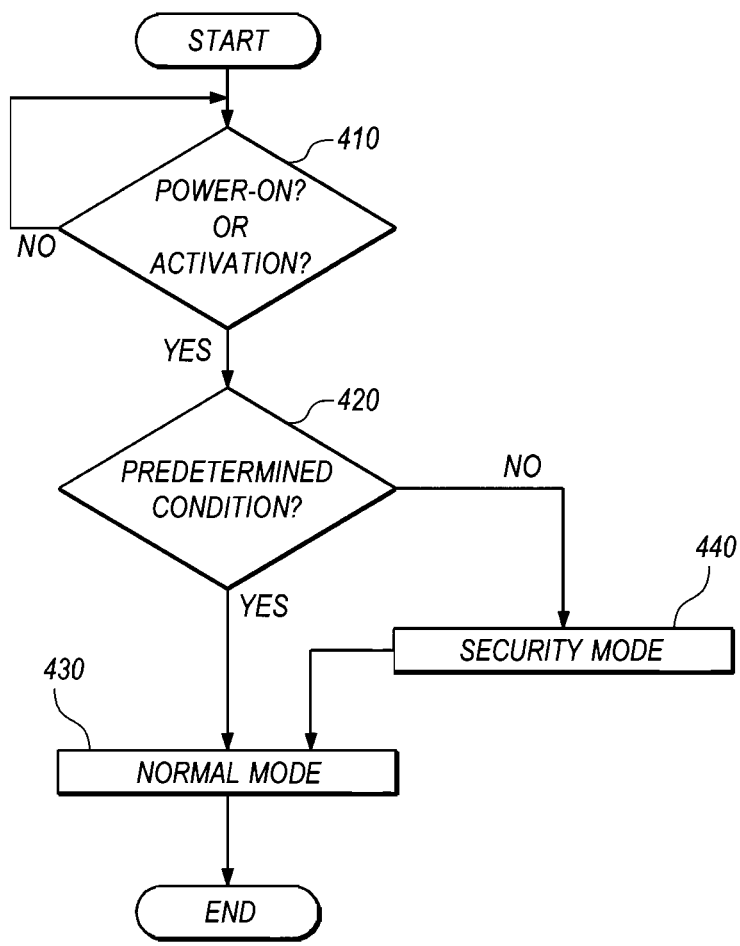
FIG. 4 is a flowchart illustrating a method of selectively applying a security mode in a mobile device according to an embodiment of the present inventive concept.

FIG. 4 illustrates a method of selectively applying a security mode in a mobile device according to an embodiment of the present inventive concept.

A power-on or activation switch is on in operation 410, a control unit of the mobile device determines whether a predetermined condition is met in operation 420. When the predetermined condition is met, that is, the mobile device is in a safe zone, the mobile device operates a normal mode in operation 430 such that a user can access the mobile device. When the predetermined condition is not met in operation 420, that is, the mobile device is not in the safe zone, the mobile device requires a user to enter a password in operation 440 to authorize the user to access the mobile device.

Figure 5:
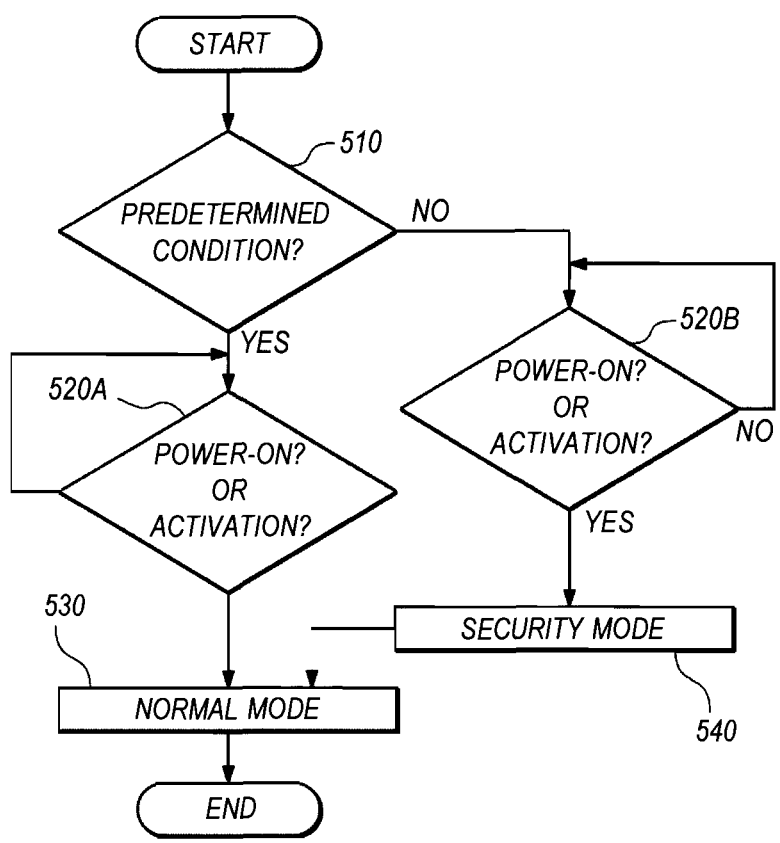
FIG. 5 is a flowchart illustrating a method of selectively applying a security mode in a mobile device according to an embodiment of the present inventive concept.

FIG. 5 illustrates a method of selectively applying a security mode in a mobile device according to an embodiment of the present inventive concept.

A predetermined condition is set in the mobile device in operation 510. When an activation switch is selected in operations 520A or 520B, a security mode is not performed to enter a normal mode in operation 530 or the security mode is performed in operation 540 when the predetermined condition is not met in operation 510. That is, the mobile device selectively performs the security mode according to selection of an activation switch as a user input. The mobile device selectively requires a user to perform the security mode. For example, when the mobile device is in a safe zone according to the predetermined condition, the user is not required to process the security mode to enter a password. However, the mobile device is not in the safe zone according to the predetermined condition, the user is still required to process the security mode to enter a password. Here, the password may be a character, number, motion, audio, and/or image.

Figure 6A:
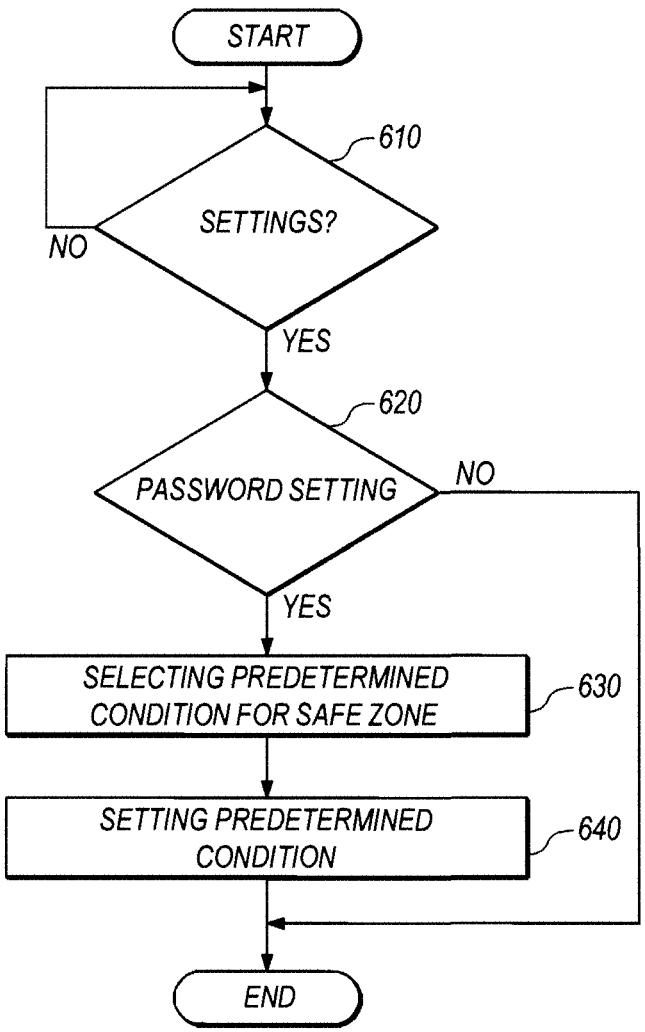
FIG. 6A is a flowchart illustrating a method of setting a condition for a safe zone in a password setting mode of a mobile device according to an embodiment of the present inventive concept.

FIG. 6A illustrates a method of setting a condition for a safe zone in a password setting mode of a mobile device according to an embodiment of the present inventive concept A user selects a settings menu in operation 610, and then selects a password setting menu in operation 620 to set the mobile device as a security (password setting) mode or a non-security (no-password setting) mode.

A predetermined condition for a safe zone is selected in operation 630, and then is set in operation 640.

Figure 6B:
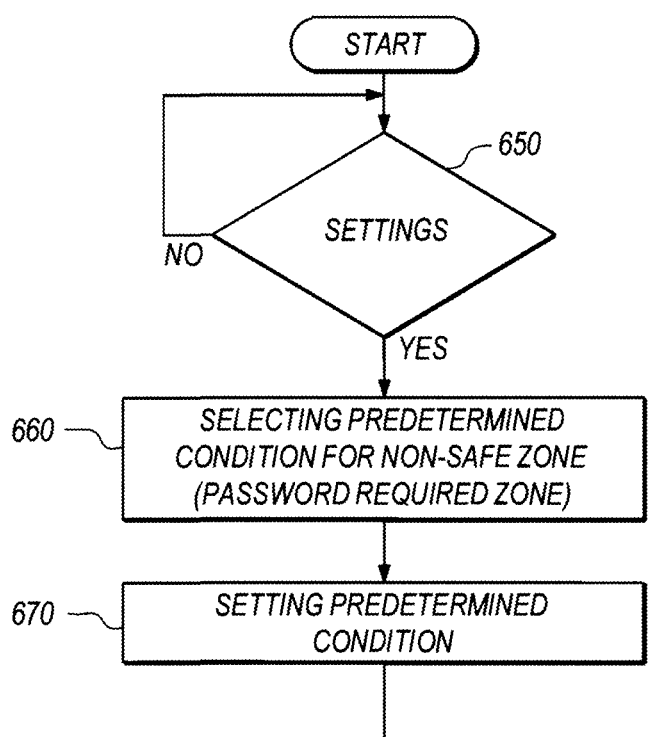
FIG. 6B is a flowchart illustrating a method of setting a condition for a non-safe zone in a non-password mode of a mobile device according to an embodiment of the present inventive concept.

FIG. 6B illustrates a method of setting a condition for a non-safe zone in a non-password mode of a mobile device according to an embodiment of the present inventive concept.

When a user selects a non-security (no-password setting) mode or does not set a security mode in the settings menu in operation 650, the settings menu may further include a menu to select a non-safe zone (or password-required zone) in operation 660. The predetermined condition can be set in operation 670 such that the mobile device monitors a current condition thereof to determine whether the current condition meets the predetermined condition. When the predetermined condition is met, the mobile device requires the user to enter a password to access the mobile device in the non-security mode of the mobile device. When the predetermined condition is not met, the mobile device does not require the user to enter the password in a similar manner to the non-security mode.

FIGS. 7A through 7I illustrate screens 700a through 7I of a mobile device to set a condition for a safe zone of a security mode or a non-safe zone of a non-security mode according to an embodiment of the present inventive concept.

Figure 7A:
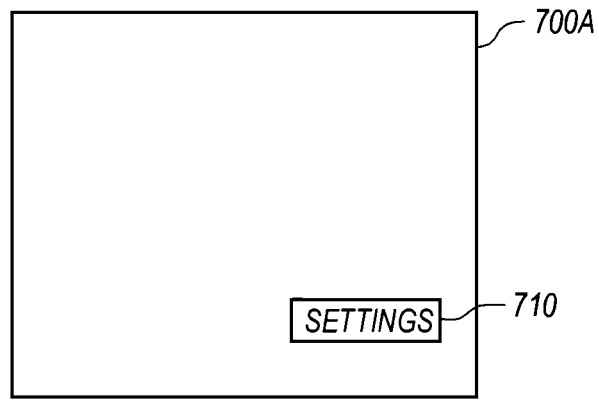
FIGS. 7A through 7I are views illustrating screens of a mobile device to set a condition in a mobile device according to an embodiment of the present inventive concept.
Figure 7B:
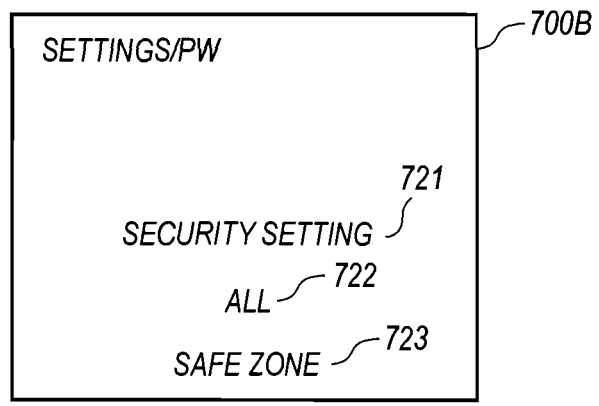
Figure 7C:
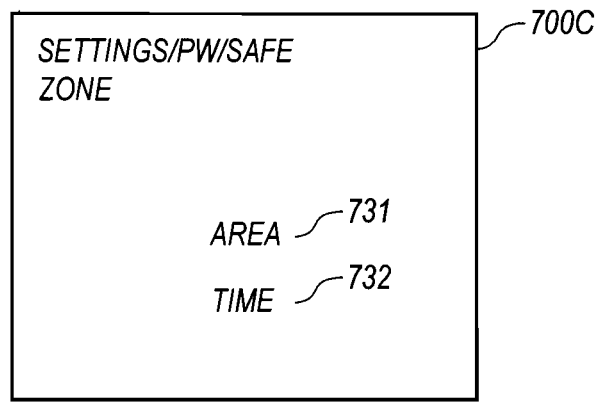

When a settings menu (button or icon) 710 is selected in the screen 700a of the mobile device as a user input in FIG. 7A, the screen 700b of FIG. 7B is displayed on a display unit and/or user input unit of the mobile device to show a selection of "security setting" 721 to set a security (password) as a security mode, a selection of "all" 722 to apply the security mode to all functions or operations of the mobile device, and a selection of a "safe zone" 723 to prevent the security mode in a predetermined condition. It is possible that the selection of "all" 722 and selection of "safe zone" 723 may be displayed in a separate screen from a screen of the security setting 721, that is, the selection of "all" 722 and selection of "safe zone" 723 may be displayed, performed, or selected independently after the security setting 721 is performed to set the security mode.

When a menu of the safe zone 723 is selected, the screen 700c is displayed to show an area menu 731 and/or a time menu 732 as the predetermined condition. It is possible that both the area menu 731 and the time menu 732 can be selected and set as the predetermined condition. It is also possible that only one of the area menu 731 and the time menu 732 can be selected and set as the predetermined condition.

When the time menu 732 is selected, a specific time or a time period is set as the safe zone, using a new screen. Setting a specific time or a time period is well known, detail descriptions thereof will be omitted. When the time menu is performed to set the predetermined condition of the safe zone, the mobile device releases the security mode at the specific time or during the time period such that the user can access the mobile device without the security process according to the set time menu.

Figure 7D:
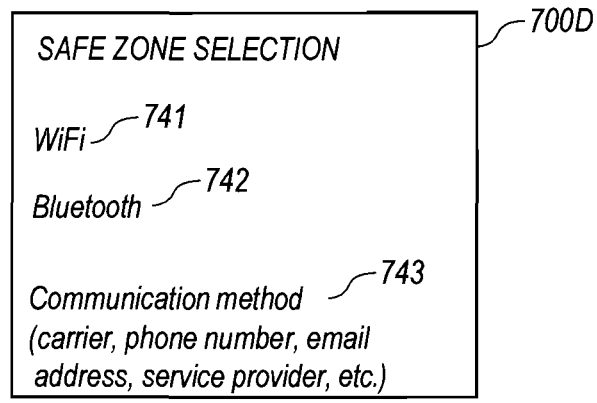

When the area menu 731 is selected, one or more area settings are displayed on the screen 700d of FIG. 7D. The one or more area settings may include a WiFi selection menu 741, a Bluetooth selection menu 742, and a communication method selection menu 743.

Figure 7E:
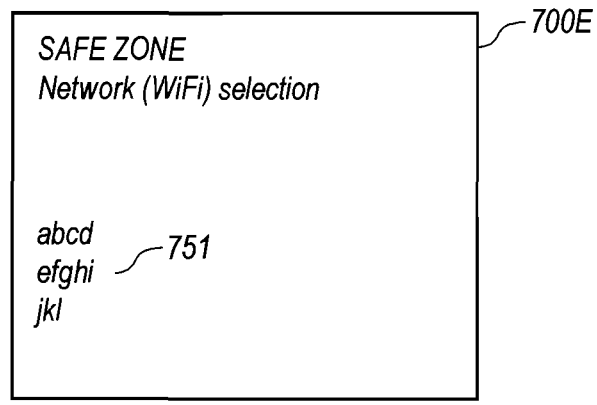

When the WiFi menu 741 is selected, at least one WiFi network 751 can be input, detected and then displayed, or selected as a safe zone in the screen 700e of FIG. 7E. When a user with a mobile device stays in a house of the user, for example, and an AP is located as a home use inside the house of the user, the AP as a home use may be reliable network and environment to the user and thus the home AP can be set as a safe zone. In this case, the user does not have to enter a password every time to activate or access the mobile device within an accessible area of the AP and/or inside the house. However, when a user with a mobile device stays away from the AP, the mobile device requires the user to enter the password since the predetermined condition is not met or the mobile device cannot communicate with the AP or lost a signal from the AP.

Figure 7F:
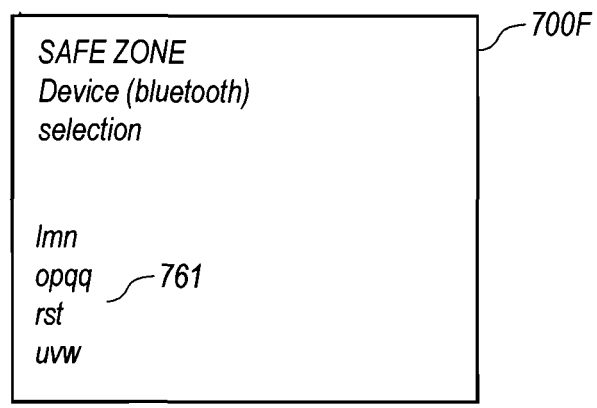

When the Bluetooth (device) is selected, at least one device 761 can be input, detected and then displayed, or selected as a safe zone in the screen 700f of FIG. 7F. When a user with a mobile device is in a vehicle owned by the user, for example, the Bluetooth and/or the vehicle may be reliable network and environment to the user and thus the device can be set as a safe zone. In this case, the user does not have to enter a password every time to activate or access the mobile device within an access area of the device, that is, within an inside of the vehicle.

It is possible that when a user vehicle is set as the device or the AP for the safe zone and when a signal indicating an emergence, for example, traffic collision or accident to the vehicle, is generated from the vehicle and then transmitted to the mobile device through the Bluetooth or WiFi, the mobile device can recognize the received signal as a predetermined condition of a safe zone so that the user can access and/or use the mobile device without entering a password in the security mode of the mobile device. Here, the vehicle and the mobile device are configured to recognize the signal as a portion of the predetermined condition of a safe zone. In this case, a combination of the selected device and a specific or predetermined signal from the selected device can be set as the safe zone of the mobile device, and when the mobile device receives the signal from the device, so that the user can access or use the mobile device without performing a security check process in a security mode of the mobile device.

It is also possible that when a user medical device is set as the device or the AP for the safe zone and when a signal indicating an emergence for example, a life threatening situation or accident to the user, is generated from the medical device and then transmitted to the mobile device through the Bluetooth or WIFi, the mobile device can recognize the received signal as a predetermined condition of a safe zone so that the user can access and/or use the mobile device without entering a password in the security mode of the mobile device. Here, the medical device and the mobile device are configured to recognize the signal as a portion of the predetermined condition of safe zone. In this case, a combination of the selected device and a specific or predetermined signal from the selected device can be set as a predetermined condition of the safe zone of the mobile device, and when the mobile device receives the signal from the device, so that the user can access or use the mobile device without performing a security check process in a security mode of the mobile device.

Figure 7G:
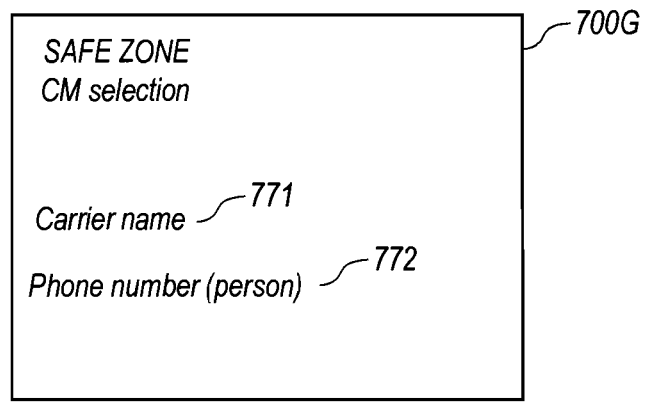

When the communication method 743 is selected, one or more communication methods (CMs) 771 and 772 can be selected and set as a safe zone on the screen 700g of FIG. 7G. In this case, a carrier name 771 and/or telephone number 772 can be reliable to the user. That is, when the user communicates with the person of the telephone number and the carrier name, the user does not have to enter a password to use the mobile device.

Figure 7H:
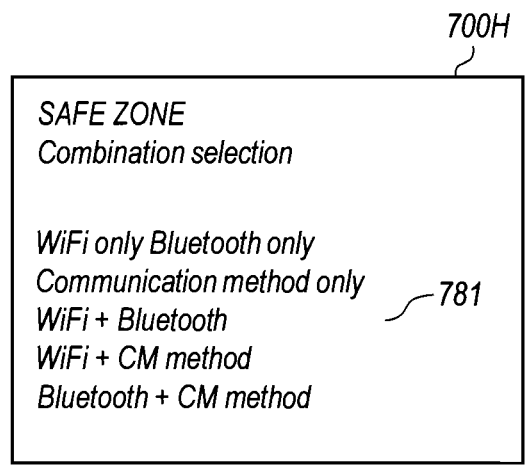
Figure 7I:
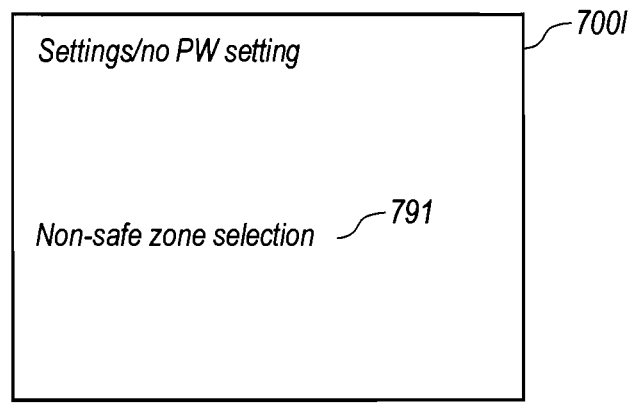

In the screen 700h of FIG. 7H, at least one or a combination of the Wifi, Bluetooth, and communication method can be selected and/or set in a menu 781 as safe zone.

When the security mode is not selected or set in the settings menu 710 of the screen 700a, a menu 791 of a non-safe zone can be selected and set such that the mobile device is set to perform a security mode in a non-security mode of the mobile device. For example, an AP, a device, or a communication method is set as the non-safe zone using one or more non-safe zone selection processes similar to the safe zone selection processes of FIGS. 7D through 7H.

Figure 8A:
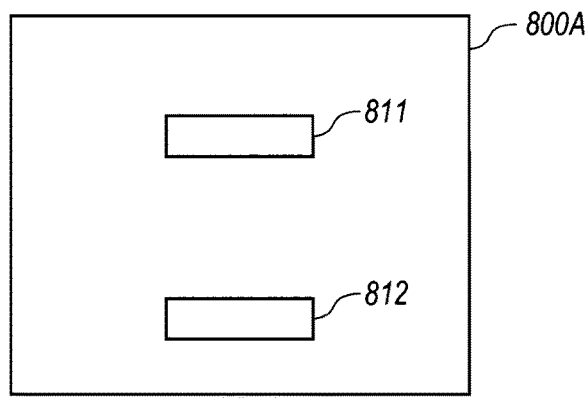
FIGS. 8A through 8F are views illustrating screens of a mobile device to perform operations in a safe zone and in a non-safe zone according to an embodiment of the present inventive concept.
Figure 8B:
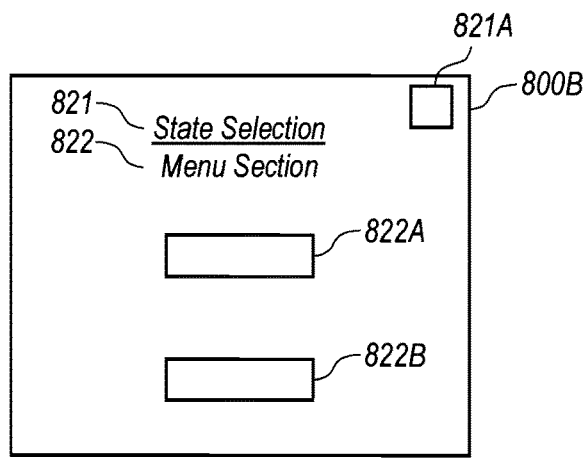
Figure 8C:
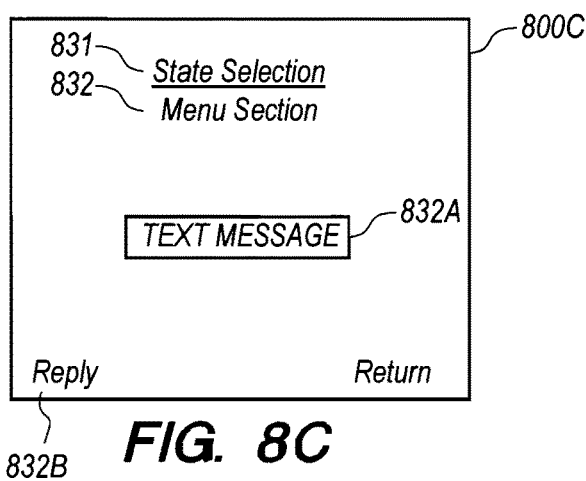
Figure 8D:
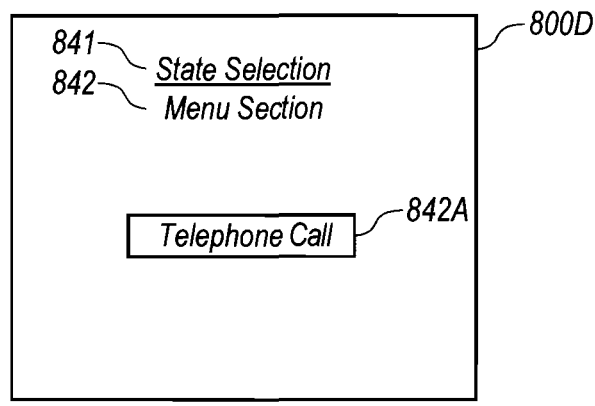

FIGS. 8A through 8F illustrate screens 800a through 800f of a mobile device to perform operations in a safe zone and in a non-safe zone according to an embodiment of the present inventive concept FIG. 8A illustrates the screen 800a, a power on/off switch 811, and an activation switch 812. FIG. 8B illustrates the screen 800b including a state section 821 and a menu section 822. The state section 821 may be similar to the state section 321, 331, and 341 of FIGS. 3B, 3C and 3D. The state section 821 may include a state indicator 821a to indicate a predetermined state and/or a safe zone in a security mode. The states displayed on the state section 821 may not be selectable by a user as a user input. The menu section 822 may include one or more menus 822a and 822n which are displayable on a display unit and/or selectable by a user as a user input.

When a current condition matches the predetermined condition as the safe zone, the mobile device displays the screen 800b by skipping a security mode process. It is possible that the mobile device can display on the screen 800c with a state section 831 and a menu section 832 including a text message 832a and a selection menus 832b relating to the displayed text message 832a when the mobile device receives the test message. It is also possible that the mobile device can display on the screen 800d with a state section 841 and a menu section 842 including a telephone call message 842a including selection menus relating to the telephone call message 842a when the mobile device receives a telephone call such that the user can access and use the mobile device.

Figure 8E:
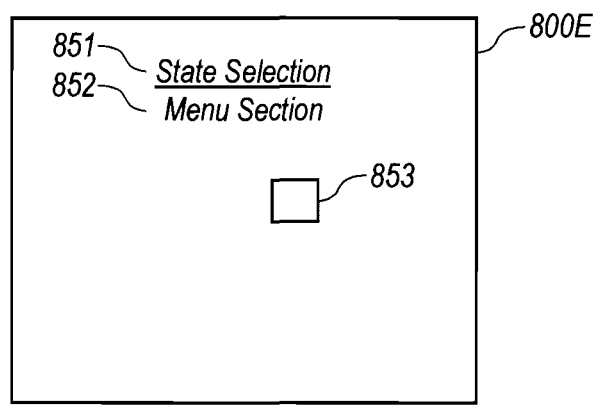
Figure 8F:
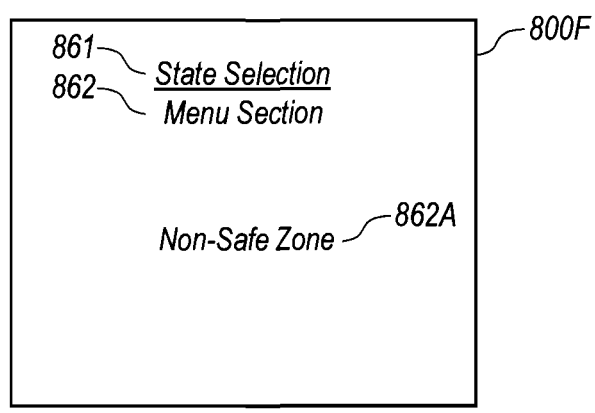

The screen 800e of FIG. 8E illustrates a state section 851 and a menu section 852 including at least one menu 853. The screen 800e may be displayed when a password is entered in a security (password-setting) mode, when a predetermined condition of a safe zone is met in the security mode, or when a password is entered in a non-security mode and in a non-safe zone. The menu 852 may be a settings menu to select, change, or modify settings of the mobile device. In this case, it is possible that the mobile device may require the user to enter a password to select, change, or modify settings when the screen 800e is displayed when a predetermined condition of a safe zone is met in the security mode and accordingly a security mode is not preformed.

Figure 9:
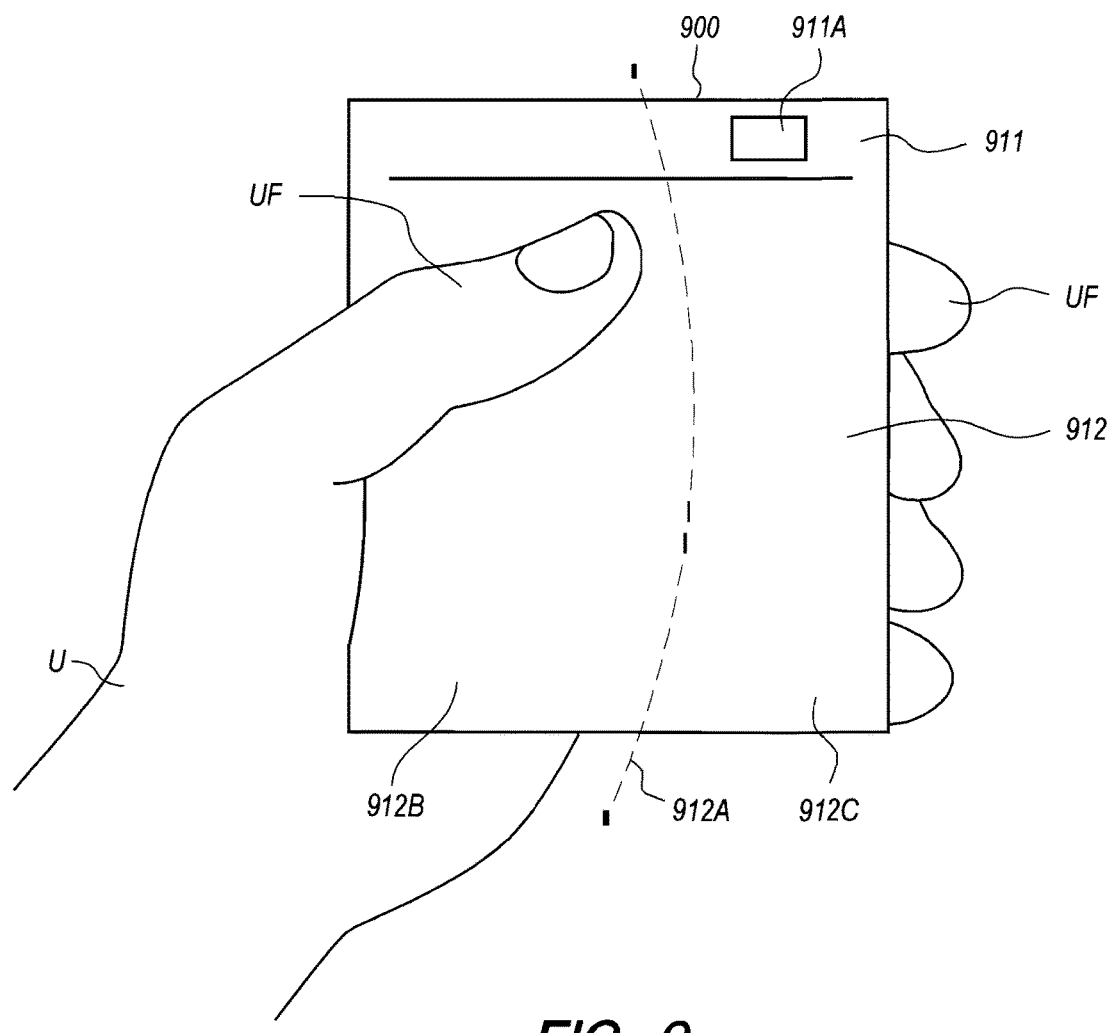
FIG. 9 is a view illustrating a mobile device to display a user input menu within a user finger-reaching area according to an embodiment of the present inventive concept.

FIG. 9 illustrates a mobile device 900 to display a state section 911 and a user menu section 912 according to an embodiment of the present general inventive concept. A user U holds the mobile device 900 using one hand. At least one of user fingers UF of the user one hand can be usable to select a menu to input a user input. The user menu section 912 may include a user menu area 912b and a non-user menu area 912c which are defined by a line to be a user-finger reachable area and a user-finger unreachable area, respectively. One or more menus or images displayed within the user menu area can be selectable by a user using a finger without assistance of the other hand finger, and one or more menus or images displayed within the non-user menu area 912c may not be reachable selectable by the user using the same finger. It is possible that the non-user menu area 912c may not include a menu to be selectable by a user as a user input. Accordingly, a user can control the mobile device with one hand.

The present general inventive concept can also be embodied as computer-readable codes on a computer-readable medium. The computer-readable medium can include a computer-readable recording medium and a computer-readable transmission medium. The computer-readable recording medium is any data storage device that can store data as a program which can be thereafter read by a computer system. Examples of the computer-readable recording medium include a read-only memory (ROM), a random-access memory (RAM), a flash memory, a semiconductor chip package, CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

As illustrated above, a mobile device can be set in a security mode and the security mode can be set with a safe zone so that a mobile device does not require a user to enter a password when a current condition matches a predetermined condition of the safe zone.

Although a few exemplary embodiments of the present general inventive concept have been shown and described, it will be appreciated by those skilled in the art that changes may be made in these exemplary embodiments without departing from the principles and spirit of the general inventive concept, the scope of which is defined in the appended claims and their equivalents.

What is claimed is:

1. A mobile device which is configured to photograph an object, comprising:
an interface configured to receive a user input, and configured to wirelessly communicate with an external network to transmit or receive a data signal;
a switch configured to change the mobile device from a power saving mode to a normal mode;
a display unit having a panel to display a photographing object; and
a control unit:
configured to set a password as a security mode and to set an exceptional condition as a safe zone of the security mode, wherein the exceptional condition comprises a wireless communication condition and an area condition;
configured to not display a screen on the display unit to receive the password, and to change the mobile device from the power saving mode to the normal mode without the password as the safe zone of the security mode when the mobile device is in the area condition and when the mobile device wirelessly communicates with the external network according to the wireless communication condition; and
configured to display the screen on the display unit to receive the password, and to change the mobile device from the power saving mode to the normal mode by receiving the password as a security check process of the security mode when the mobile device is not in the area condition or when the mobile device does not wirelessly communicate with the external network according to the wireless communication condition.

2. The mobile device of claim 1, wherein:
the wireless communication condition of the exceptional condition comprises a wireless communication of the mobile device with the external network; and
the area condition comprises an area in which the mobile device is located.

3. The mobile device of claim 1, wherein the area condition is associated with the data signal of the external network.

4. The mobile device of claim 1, wherein the area condition comprises a home or an environment.

5. The mobile device of claim 1, wherein the area condition comprises an area defined by a line.

6. The mobile device of claim 1, wherein:
the area condition comprises a house location;
the control unit displays the screen when the mobile device is not in the house location; and
the control unit does not display the screen when the mobile device is in the house location and when the mobile device wirelessly communicates with the external network according to the wireless communication condition.

7. The mobile device of claim 1, wherein the external network comprises at least one network using a WIFI device, a wireless communication station, a carrier service station, a service provider, a wireless communication device, another mobile device, a home appliance, a vehicle, and a medical device.

8. The mobile device of claim 1, wherein the switch comprises a sensor to detect a motion of the mobile device or to detect a motion or image of a user.

9. The mobile device of claim 1, wherein the area condition is set after the password is set or input as the security mode.

10. The mobile device of claim 1, wherein the control unit determines whether to display the screen or not when the mobile device is changed from the power saving mode to the normal mode after the exceptional condition is set.

11. The mobile device of claim 1, wherein the control unit displays the screen to perform the security check process of the security mode in response to an operation of the switch when a location of the mobile device does not match an area of the area condition or when the mobile device is not connected to the external network for wireless communication.

12. The mobile device of claim 1, wherein the control unit does not display the screen to skip the security check process of the security mode in response to an operation of the switch when a location of the mobile device matches an area of the area condition and when the mobile device is connected to the external network for wireless communication.

13. The mobile device of claim 1, wherein:
the display unit displays an unlock message section for an unlock operation according to an operation of the switch; and
the display unit does not display the screen in response to the unlock operation when a location of the mobile device is an area of the area condition and when the interface of the mobile device wirelessly communicates with the external network.

14. The mobile device of claim 1, wherein:
the external network comprises a plurality of external devices; and
the control unit is configured to select a combination of the plurality of external devices to set the wireless communication condition of the exceptional condition.

15. The mobile device of claim 1, wherein the wireless communication condition of the exceptional condition comprises a connection state of the external network for wireless communication.

16. The mobile device of claim 1, wherein the control unit displays the screen to receive the password when the area condition is set or when the area condition is changed.

17. The mobile device of claim 1, wherein the wireless communication condition of the exceptional condition comprises a wireless communication method between the mobile device and the external network.

18. The mobile device of claim 1, wherein:
the interface wirelessly communicates with a plurality of external networks; and
the control unit is configured to set a combination of the plurality of external networks as the wireless communication condition of the exceptional condition.

19. The mobile device of claim 1, wherein:
the control unit is configured to select the external network as the wireless communication condition of the exceptional condition; and
the control unit does not display the screen on the display unit to receive the password, and to change the mobile device from the power saving mode to the normal mode without the password as the safe zone of the security mode when the mobile device is located at an area of the area condition or when the mobile device is connected to the selected external network.

20. The mobile device of claim 1, wherein:
the control unit is configured to select an area as the area condition of the exceptional condition; and the control unit does not display the screen on the display unit to receive the password, and to change the mobile device from the power saving mode to the normal mode without the password as the safe zone of the security mode when the mobile device is located at the selected area or when the mobile device is connected to the external network.

\* \* \* \* \*